(12) United States Patent
Chuang et al.

(10) Patent No.: US 10,356,438 B2
(45) Date of Patent: Jul. 16, 2019

(54) METHOD AND APPARATUS OF ERROR HANDLING FOR VIDEO CODING USING INTRA BLOCK COPY MODE

(71) Applicant: MEDIATEK INC., Hsin-Chu (TW)

(72) Inventors: Tzu-Der Chuang, Zhubei (TW); Chia-Yun Cheng, Zhubei (TW); Han-Liang Chou, Hsinchu County (TW); Ching-Yeh Chen, Taipei (TW); Yu-Chen Sun, Keelung (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/578,191

(22) PCT Filed: Jun. 3, 2016

(86) PCT No.: PCT/CN2016/084767
§ 371 (c)(1),
(2) Date: Nov. 29, 2017

(87) PCT Pub. No.: WO2016/192677
PCT Pub. Date: Dec. 8, 2016

(65) Prior Publication Data
US 2018/0152727 A1    May 31, 2018

Related U.S. Application Data

(60) Provisional application No. 62/170,267, filed on Jun. 3, 2015.

(51) Int. Cl.
*H04N 19/593* (2014.01)
*H04N 19/563* (2014.01)
(Continued)

(52) U.S. Cl.
CPC ......... *H04N 19/563* (2014.11); *H04N 19/513* (2014.11); *H04N 19/593* (2014.11); *H04N 19/70* (2014.11)

(58) Field of Classification Search
None
See application file for complete search history.

(56) References Cited

U.S. PATENT DOCUMENTS

2003/0117416 A1 * 6/2003 Danielsen ............ H04N 19/563
345/606
2008/0002772 A1   1/2008 Song et al.
(Continued)

FOREIGN PATENT DOCUMENTS

WO    2015/054813 A1    4/2015

OTHER PUBLICATIONS

International Search Report dated Aug. 24, 2016, issued in application No. PCT/CN2016/084767.
(Continued)

*Primary Examiner* — Kate H Luo
(74) *Attorney, Agent, or Firm* — Oblon, McClelland, Maier & Neustadt, L.L.P.

(57) ABSTRACT

In order to overcome the issue caused by a decoded block vector (BV) pointing to a reference block overlapping with an unavailable area, various methods are disclosed. According to one method, if the reference block overlaps with an unavailable area, the reference pixels in the unavailable area are generated for IntraBC prediction of the current block by padding from neighboring available pixels. The padding can be done in the horizontal direction and then the vertical direction. The padding may also done in the vertical direction first and then horizontal direction. In another method, if the reference block overlaps with an unavailable area, the reference pixels in the unavailable area are generated for
(Continued)

IntraBC prediction of the current block by using previous decoded pixels in the unavailable area. A pre-defined value may also be used for the unavailable area.

11 Claims, 4 Drawing Sheets (51) Int. Cl.
*H04N 19/513* (2014.01)
*H04N 19/70* (2014.01)

(56) References Cited

U.S. PATENT DOCUMENTS

| | | |
|---|---|---|
| 2014/0301465 A1 | 10/2014 | Kwon et al. |
| 2014/0301475 A1 | 10/2014 | Guo et al. |
| 2014/0376634 A1 | 12/2014 | Guo et al. |
| 2015/0049813 A1 | 2/2015 | Tabatabai et al. |
| 2015/0071357 A1* | 3/2015 | Pang .................. H04N 19/563 375/240.16 |
| 2015/0296213 A1 | 10/2015 | Hellman |
| 2017/0223379 A1* | 8/2017 | Chuang ............. H04N 19/167 |

OTHER PUBLICATIONS

Pang, Chao et al.; Non-RCE3: Intra Motion Compensation with 2-D MVs; Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013; JCTVC-N0256-v3 (Aug. 2, 2013).

Budagavi Madhukar et al.; AHG8: Video coding using Intra motion compensation; Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013; JCTVC-M0350-v2 (Apr. 26, 2013).

Office Action dated Dec. 20, 2018, in related U.S. Appl. No. 15/578,221, reference AA cited therein.

Office Action dated Dec. 18, 2018, in related U.S. Appl. No. 15/578,184, reference AA cited therein.

* cited by examiner

Fig. 6

METHOD AND APPARATUS OF ERROR HANDLING FOR VIDEO CODING USING INTRA BLOCK COPY MODE

CROSS REFERENCE TO RELATED APPLICATIONS

The present invention claims priority to U.S. Provisional Patent Application, Ser. No. 62/170,267, filed on Jun. 3, 2015. The U.S. Provisional Patent Application is hereby incorporated by reference in its entirety.

FIELD OF THE INVENTION

The present invention relates to video coding using Intra Block Copy (IntraBC) mode. In particular, the present invent relates to error handling for a coding system using the Intra block copy mode.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include screen content coding (SCC). Due to specific characteristics of screen contents, coding tools have been developed and demonstrate significant gains in coding efficiency. Among them, the colour index coding (a.k.a. major colour based coding) techniques represent block of pixels using indices to the palette (major colours), and encode the palette and the indices by exploiting spatial redundancy. While the total number of possible colour combinations is huge, the number of colours in an area of picture is usually very limited for typical screen contents. Therefore, the colour index coding becomes very effective for screen content materials. Related key colour index coding techniques are briefly reviewed as follows.

Figure 1:
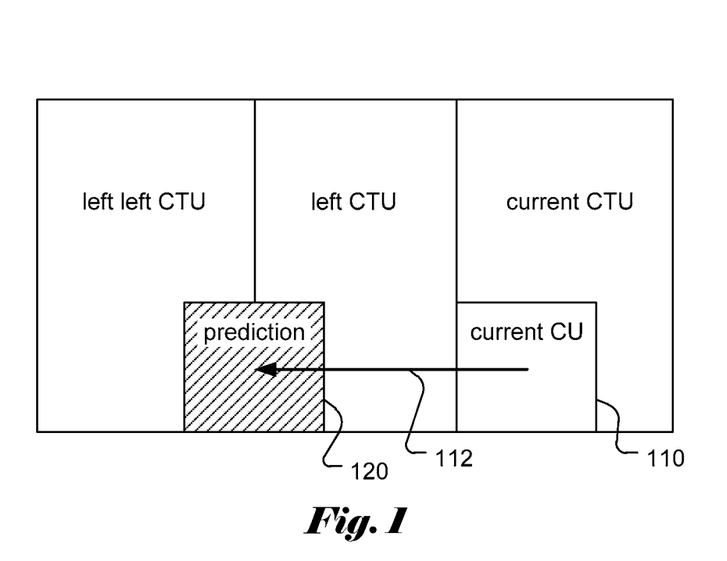
FIG. 1 illustrates an example of Intra Block Copy (IntraBC), where the block vector is restricted to the horizontal direction.

During the Course of Screen Content Coding (SCC) development, various video coding tools have been described, including the "Intra picture block copy" (IntraBC) technique. The IntraBC technique was first disclosed in JCTVC-M0350 (Budagavi et al., *AHG8: Video coding using Intra motion compensation*, Joint Collaborative Team on Video Coding (JCT-VC) of ITU-T SG16 WP3 and ISO/IEC JTC 1/SC 29/WG11 13th Meeting: Incheon, KR, 18-26 Apr. 2013, Document: JCTVC-M0350). An example according to JCTVC-M0350 is shown in FIG. 1, where a current coding unit (CU, 110) is coded using Intra MC (motion compensation). The Intra MC is also named as Intra Block Copy (IntraBC). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named motion vector (MV) or block vector (BV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process.

In JCTVC-M0350, the IntraBC is different from the motion compensation used for Inter prediction in at least the following areas:

BVs are restricted to be 1-D for IntraBC (i.e., either horizontal or vertical) while Inter prediction uses 2-D motion estimation.

Binarization is fixed length for IntraBC while Inter prediction uses exponential-Golomb.

IntraBC introduces a new syntax element to signal whether the BV is horizontal or vertical.

Based on JCTVC-M0350, some modifications are disclosed by Pang, et al., in *Non-RCE3: Intra Motion Compensation with 2-D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the IntraBC is extended to support 2-D MVs, so that both vertical and horizontal MV components can be non-zero at the same time. This provides more flexibility to IntraBC than the original approach, where the MV is restricted to be strictly horizontal or vertical.

Figure 2:
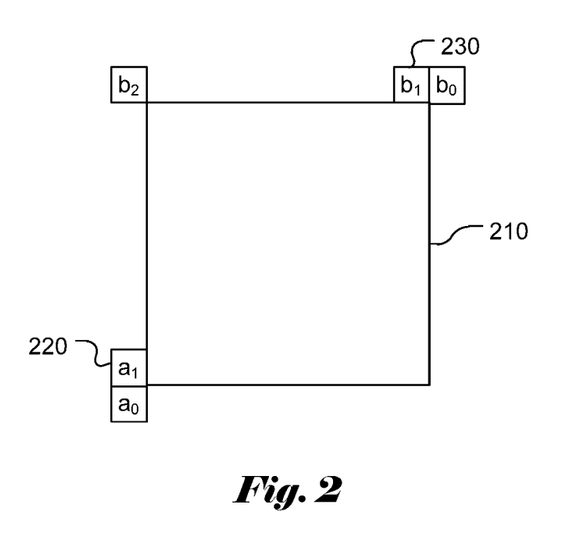
FIG. 2 illustrates an example of constructing motion vector predictor candidate list based on motion vectors of spatial neighbouring blocks.

In JCTVC-R0309 (Pang, et al., "Non-SCCE1: Combination of JCTVC-R0185 and JCTVC-R0203", JCTVC-R0309, Joint Collaborative Team on Video Coding (JCT-VC) of ITU-T SG 16 WP 3 and ISO/IEC JTC 1/SC 29/WG 11, 18th Meeting: Sapporo, J P, July 2014), the neighbouring BVs and coded BVs are used as BV predictor (BVP). The BV predictor is derived similar to the AMVP (advanced motion vector prediction) scheme in HEVC. The predictor candidate list is constructed by first accessing in order the spatial neighbouring blocks $a_1$ (220) and $b_1$ (230) of a current block (210) as shown in FIG. 2. If any of the spatial neighbours doesn't have a block vector, the last two coded BVs are used as substitute block vectors to fill the block vector candidate list so that the list contain two different entries. The substitute block vectors are initialized with $(-2*CU\_width, 0)$ and $(-CU\_width, 0)$, where CU_width is the width of the CU. To avoid the line buffer, the above BV out of current CTU is considered unavailable. The last two coded BVs are reset to (0, 0) for each CTU to prevent the data dependency.

In HEVC, Merge candidates are derived from spatial/temporal neighbour blocks for the current coded block in an Inter coded slice. A merge_flag is used to signal whether the current block is merged into one of its candidates. If yes, another index is used to signal which of the candidates is used for Merge mode. For example, if candidate block $a_1$ in FIG. 2 is signalled as the candidate to be used, then the current block will share the same motion vector and reference picture as those in block $a_1$.

If any Merge candidate is not available (e.g. non-existing or not coded in Inter mode), additional candidates are inserted into the candidate list. If the Merge candidate list is still not full after inserting the additional candidates, zero motion vector with reference index (i.e., refIdx) equal to 0 will be used to fill all the empty candidates.

Two types of additional candidates can be inserted:
1. Combined bi-predictive Merge candidate (candidate type 1)
2. Zero vector Merge/AMVP candidate (candidate type 2)

The type-2 additional candidates are inserted after the type-1 additional candidates.

For the type-1 candidate, combined bi-predictive Merge candidates are generated by combining original Merge candidates. In particular, two original candidates, which have mvL0 (the motion vector in list 0) and refIdxL0 (the reference picture index in list 0), or mvL1 (the motion vector in list 1) and refIdxL1 (the reference picture index in list 1), are used to generate bi-predictive Merge candidates.

For the type-2 candidate, zero-vector Merge/AMVP candidates are generated by combining zero vectors and reference index which can be referred. If zero-vector candidates are not duplicated, it is added to Merge/AMVP candidate set.

In SCM-2.0 (Joshi, et al., *Screen content coding test model 2* (*SCM 2*), Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R1014), coding of block vector difference is modified to use one context-coded bin for coding each vector component. Methods to further improve the coding efficiency and to enable unification of BVD and MVD coding have also been disclosed in the literature.

Figure 3:
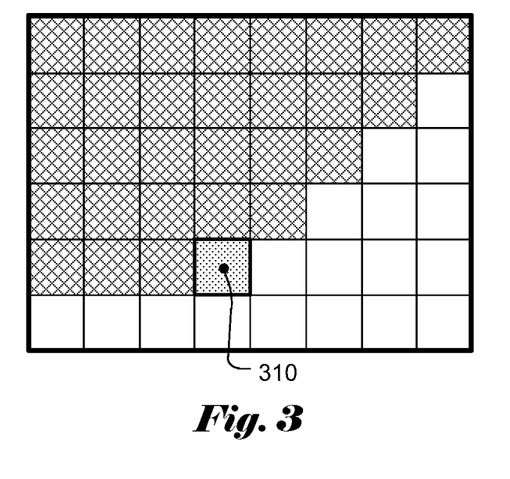
FIG. 3 illustrates an example of a ladder shaped IntraBC search range according to existing HEVC SCC (high efficiency video coding-screen content coding) specification.

In SCM-3.0 (Joshi, et al., *Screen content coding test model 3* (*SCM 3*), Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-51014), a ladder shaped IntraBC search range constraint is adopted, as shown in FIG. 3, where the blocks with cross-lined background indicate the ladder shape IntraBC search range and block 310 corresponds to the current CTU. For an IntraBC block in current CTU, the available search area is constrained to the CTUs with dotted background and the reconstructed blocks in the current CTU.

BRIEF SUMMARY OF THE INVENTION

In order to overcome the issue caused by a decoded block vector (BV) pointing to a reference block overlapping with an unavailable area, various methods are disclosed. According to one method, if the reference block overlaps with an unavailable area, the reference pixels in the unavailable area are generated for IntraBC prediction of the current block by padding from neighbouring available pixels. The padding can be done in the horizontal direction and then the vertical direction. The padding may also done in the vertical direction first and then horizontal direction.

According to another method, if the reference block overlaps with an unavailable area, the reference pixels in the unavailable area are generated for IntraBC prediction of the current block by using previous decoded pixels in the unavailable area. In one embodiment, all pixels in a storage area of the current picture are set to a pre-defined value before decoding the current picture and storing a previous decoded block in the storage area of the current picture. The reference block for the current block is fetched directly from the storage area of the current picture regardless whether the reference block is in the unavailable area or not. Accordingly, when previous decoded pixels are not available, the pre-defined value will be used. The pre-defined value can be equal to (1<<(bit_depth−1)), where bit_depth corresponds to bit depth of the current picture.

According to yet another method, if the reference block overlaps with an unavailable area, the reference pixels in the unavailable area are generated for IntraBC prediction of the current block by using a pre-defined value. The pre-defined value can be equal to (1<<(bit_depth−1)), where bit_depth corresponds to bit depth of the current picture. In one embodiment, if the reference block overlaps with an unavailable area, the whole block is set to the pre-defined value. The pre-defined value can be signalled in a SPS (sequence parameter set), PPS (picture parameter set), or slice header.

Another aspect of the present invention addresses the issue of determining whether to use integer motion vector. According to the present invention, one or two previously coded slices, tiles or pictures are used to determine whether to use integer motion vector for the current slice, tile or picture.

Yet another aspect of the present invention addresses the issue of adaptive colour transform (ACT). According to the present invention, pixel-level ACT is used. For example, pixel-level inverse CCP process and inverse ACT process can be applied in cascade by passing an inverse CCP processed pixel directly to the inverse ACT process. In another example, pixel-level inverse ACT process and pixel reconstruction process can be applied in cascade by passing an inverse ACT processed pixel directly to the pixel reconstruction process.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Error Handling for Video Coding Using Intra Block Copy Mode

In SCC, the decoder might have a decoded BV that point to unavailable area. For example, the decoded BV is resulted from a bitstream with transmission error. An encoder could also generate an incorrect BV. This could happen especially in multiple tile process and multiple slice process. The decoder behaviour regarding how to compensate the IntraBC block is undefined when the coded BV point to unavailable area.

In order to overcome this issue, a method of the present invention generates the un-available data is disclosed.

Embodiment 1: Padding Unavailable Pixels

If the IntraBC reference block is overlapped with the unavailable area, the textures in the unavailable are padded by using the neighbouring available pixels. The padded textures are used for IntraBC compensation. The padding can be performed individually in the horizontal direction and the vertical direction. For example, for the unavailable area, the horizontal padding can be applied first followed by the vertical padding. Alternatively, the vertical padding can be applied first followed by the horizontal padding for the unavailable area.

Embodiment 2: Using the Previous Decoded Pixels for the Unavailable Area Outside the Ladder Shape Boundary If the IntraBC reference block is overlapped with the previously reconstructed, but unavailable area outside the ladder shape boundary, the decoded samples outside the ladder shape boundary are used even if they are considered as unavailable.

Figure 4:
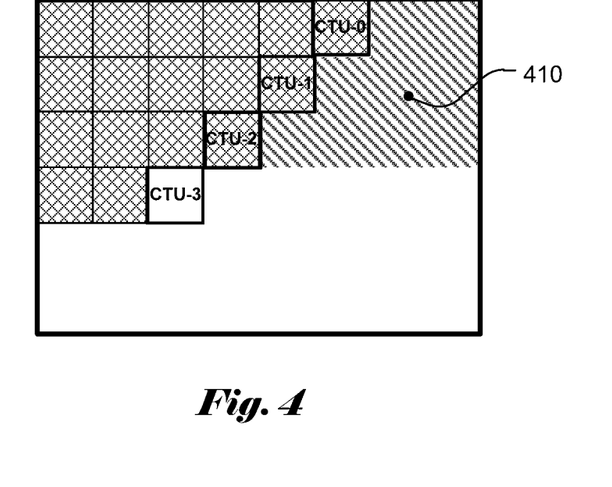
FIG. 4 illustrates an example of using previous decoded pixels outside the ladder shape boundary according to an embodiment of the present invention.

FIG. 4 illustrates an example of using previous decoded pixels outside the ladder shape boundary. Coding tree units CTU-0, CTU-1 and CTU-2 correspond to the leading CTUs in respective CTU rows or slices that the current CTU CTU-3 can refer as IntraBC reference data. In other words, the cross-line filled ladder shape area corresponds to the IntraBC reference data that CTU-3 can use for IntraBC prediction. On the other hand, the slant-line filled area 410 corresponds to the area that has been reconstructed. However, in the conventional IntraBC process, this area outside the ladder shape boundary cannot be used as reference data for CTU-3. According to an embodiment of the present invention, if the reference block is overlapped with the slant-line filled area 410, the previous decoded pixels in the slant-line filled area 410 are used as for IntraBC prediction.

In the above example, pixels in the unavailable area outside the ladder shape boundary may not be decoded yet. In order to overcome this issue, all samples in the current picture can be reset to a pre-defined value before decoding the current picture. For example, the pre-defined value can be set to $(1<<(bit\_depth-1))$. During the current picture decoding, the current picture is updated. For IntraBC coding, the reference block samples are directly fetched from the current picture regardless whether the samples are in the available area or not. Therefore, if the pixels in the unavailable area outside the ladder shape area have been previously decoded, the previous decoded pixels will be used for IntraBC prediction. Otherwise, if the pixels in the unavailable area are accessed, the accessed data correspond to the pre-defined data according to this arrangement. The pre-defined value can be defined in standard or signalled in the SPS (sequence parameter set), PPS (picture parameter set), or slice header.

Whether a reference block is inside the ladder shape boundary can be determined according to the following condition:

$$(xPb+(mv\_x>>2)+nPbSw-1+\text{offset}X)/CtbSizeY-xCb/ \\ CtbSizeY<=yCb/CtbSizeY-(yPb+(mv\_y>>2)+ \\ nPbSh-1+\text{offset}Y)/CtbSizeY. \quad (1)$$

In the above equation, (xPb, yPb) specifies the top-left sample location of the current luma prediction block relative to the top-left luma sample of the current picture, (xCb, yCb) sepecifies the the top-left luma sample location of the current luma coding block relative to the top-left luma sample of the current picture, nPbSw and nPbSh are the PU width and PU height, CtbSizeY is the CTU height. The variables offsetX and offsetY are derived as follows:

$$\text{offset}X=(\text{ChromaArrayType}==0)?0:(mvCLX[0]\& \\ 0x7?2:0)$$

$$\text{offset}Y=(\text{ChromaArrayType}==0)?0:(mvCLX[1]\& \\ 0x7?2:0)$$

If the condition in eq. (1) is satisfied, it implies that the reference block is inside the ladder shape reference area. If the condition is false, it implies that the reference block is outside the ladder shape reference area and the embodiment mentioned above is applied.

Embodiment 3: Setting Pixels in Unavailable Area to a Predefined Value

In this embodiment, only the previous decoded data in the available area is allowed to be used as the IntraBC reference data. If the IntraBC reference block is overlapped with the unavailable area, the textures in the unavailable are set to a predefined value, such as $(1<<(bit\_depth-1))$ or 128 according to this embodiment. Therefore, if the IntraBC reference block is overlapped with the unavailable area, the predefined pixel values can be used. The predefined value can be signalled in the SPS (sequence parameter set), PPS (picture parameter set), or slice header.

Embodiment 4: Setting to a Predefined Value for all Pixels of the Reference Block If the IntraBC reference block is overlapped with the unavailable area, the textures of the whole reference block are set to a predefined value, such as $(1<<(bit\_depth-1))$. The predefined value can be signalled in the SPS (sequence parameter set), PPS (picture parameter set), or slice header.

Using Coded Slices/Tiles/Pictures to Determine MV Resolution

In screen content coding (SCC), a SPS-level syntax motion_vector_resolution_control_idc is signalled in the SPS to control the presence and inference of the use_integer_mv_flag that specifies the resolution of motion vectors for Inter prediction. If the motion_vector_resolution_control_idc is 2, the slice-level syntax use_integer_mv_flag is signalled. If the use_integer_mv_flag is 1, it implies that the MV resolution of this slice is integer pixel. Otherwise, the MV resolution of this slice is quarter pixel. In SCM-4.0 (Joshi et al., *Screen content coding test model 4* (*SCM 4*), JCTVC-T1014, ITU-T SG16 WP3 and ISO/IEC JTC1/SC29/WG11, 20th Meeting: Geneva, CH, February 2015, Document: JCTVC-T1014), the value of use_integer_mv_flag is determined by checking the similarity of the current picture and the previous coded picture. However, it requires two-pass encoding. The first pass is to determine the similarity, and the second pass is to encode the slice/picture.

According to another method of the present invention, only the previous coded slice/picture is used to determine the value of use_integer_mv_flag. For example, two previous coded slices/pictures are selected to determine the value of use_integer_mv_flag. These two pictures can be two pictures that closed to the current picture. In another example, one picture (e.g. picture-A) is the first picture in List_0 of the current picture, and the other picture is the first picture in List_0 of the first picture in List_0 of the current picture (i.e., the first picture in List_0 of the picture-A).

In another example, the statistic of the current picture can be used to decide the use_integer_my_flag of the following pictures.

Enlarging IntraBC Search Range

In the software for HEVC Range Extension version 6.0 (RExt-6.0), the IntraBC search range for a current block (i.e., a CU) is the current CTU and left CTU. The pixels for IntraBC prediction and compensation are the un-filtered pixels, which are the pixels before deblocking and SAO.

One method of the present invention increases the IntraBC search range to be larger than the current CTU and left CTU. The pixels for IntraBC prediction and compensation can be the un-filtered pixels or filtered pixels depending on the position of the pixels.

For example, the pixels for IntraBC prediction and compensation can be the un-filtered pixels for the pixels in current CTU and left CTU. Other pixels are using filtered pixels (i.e., after deblocking and SAO).

In another example, the pixels for IntraBC prediction and compensation can be the un-filtered pixels for the pixels in current CTU, left CTU, and four above lines of the current CTU and left CTU. Other pixels are using filtered pixels.

In yet another example, the pixels for IntraBC prediction and compensation can be the un-filtered pixels for the pixels in current CTU, four above lines of current CTU, and four left column of current CTU. Other pixels are using filtered.

In yet another example, the pixels for IntraBC prediction and compensation can be the un-filtered pixels for the pixels above four pixel lines of current CTU row. Other pixels are using filtered.

IntraBC Buffer Management

In SCM-4.0, the pre-deblocking texture of current picture needs to be stored for IntraBC search and compensation. The texture after SAO process of current picture is also need to be stored as the reference frames for the following picture coding. In the present invention, in order to reduce the buffer size, the pre-deblocking texture of current picture and the texture difference between pre-deblocking texture and after SAO texture are stored. Alternatively, the after-SAO texture and the texture difference between pre-deblocking texture and after SAO texture are stored. Since the SAO and deblocking filter will not change the picture value by much, the bit-depth of the texture difference should be less than the bit-depth of the normal reconstructed texture.

Pixel-Level ACT

In HEVC Range Extension (HEVC-RExt) and HEVC Screen Content Coding (HEVC-SCC), there is a coding tool called cross-component prediction (CCP). CCP uses luma/G residual to predict the chroma/B/R residual. In the SCC, an in-loop adaptive colour transform (ACT) has proposed to remove the redundancy among the colour components. In SCM-2.0, the ACT is a CU-level process. In SCM-3.0, the ACT is modified as a TU-level process.

Figure 5:
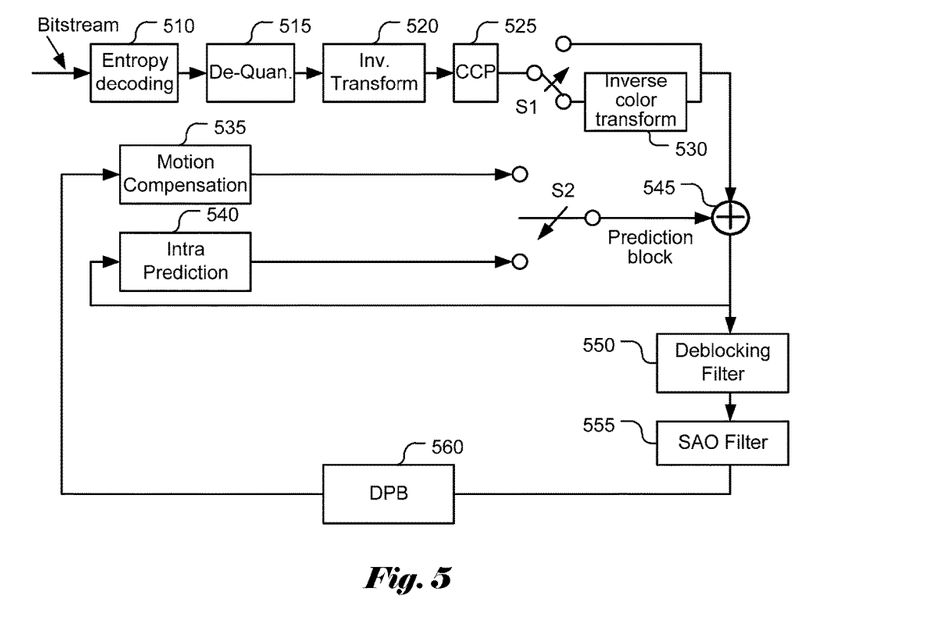
FIG. 5 illustrates a block diagram of a decoding system incorporating in-loop colour-space transform.

An example of decoding system block diagram including the in-loop colour-space transform is shown in FIG. 5. An additional module, i.e., inverse colour-space transform (530) is included. Various modules are shown in FIG. 5 including entropy decoder (510), de-quantization (515), inverse transform (520), cross-component prediction (CCP, 525), motion compensation (535), Intra prediction (540), adder (545), deblocking filter (550), SAO (sample adaptive offset) filter (555) and DPB (decoded picture buffer, 560). The decoder also includes a first switch (S1) select inverse colour-space transform (in the lower position) or bypass the inverse colour-space transform (in the upper position). The decoder also includes a second switch (S2) select Inter prediction (in the upper position) or Intra prediction (in the lower position). Other than the inverse colour-space transform (530), all other modules are standard decoder modules used in conventional HEVC. When a block is coded with the colour-space transform enabled, the inverse colour-space transform is invoked to convert the residual domain back to the original domain for the output from the conventional inverse DCT/DST transform and CCP.

Two different colour-space transforms are applied depending on whether the CU is coded in a lossless or lossy manner. The forward and the inverse colour-space transforms for lossy coding use the YCoCg transform matrices, which are defined as follows:

$$\text{Forward: } \begin{bmatrix} C'_0 \\ C'_1 \\ C'_2 \end{bmatrix} = \begin{bmatrix} 1 & 2 & 1 \\ 2 & 0 & -2 \\ -1 & 2 & -1 \end{bmatrix} \begin{bmatrix} C_0 \\ C_1 \\ C_2 \end{bmatrix} \Big/ 4, \text{ and} \quad (2)$$

$$\text{Inverse: } \begin{bmatrix} C_0 \\ C_1 \\ C_2 \end{bmatrix} = \begin{bmatrix} 1 & 1 & -1 \\ 1 & 0 & 1 \\ 1 & -1 & -1 \end{bmatrix} \begin{bmatrix} C'_0 \\ C'_1 \\ C'_2 \end{bmatrix}, \quad (3)$$

wherein the original colour space ($C_0$, $C_1$, $C_2$) may correspond to (R, G, B), (Y, Cb, Cr) or (Y, U, V).

In the present invention, the pixel-level process is disclosed. For example, when processing each residual sample in CCP, the YUV/YCbCr/RGB residual samples can be loaded and the ACT can be performed in cascade after pixel-level CCP process. The ACT will not need an additional processing stage. In another example, the pixel-level ACT is performed in the reconstruction stage when adding the residual with predictors. The inverse ACT for each residual sample is first applied and then the final residual sample is added with predictor.

In yet another embodiment, the ACT process in the block level is disclosed. The block size is M×N, where M and N are both positive integers and the block size can be predetermined or transmitted in the bitstream. For example, when processing the residual samples within each block (e.g. 4×4) in CCP, the YUV/YCbCr/RGB residual samples can be loaded and the ACT can be cascaded performed after block-level CCP process.

In another example, when the inverse transform is performed on the last colour component (e.g. the V, Cr, B, or R component), the inverse ACT process can be applied in cascade with the inverse transform if the CCP is turn off. If CCP is on, the inverse CCP process and inverse ACT process can be applied in cascade with the inverse transform.

Figure 6:
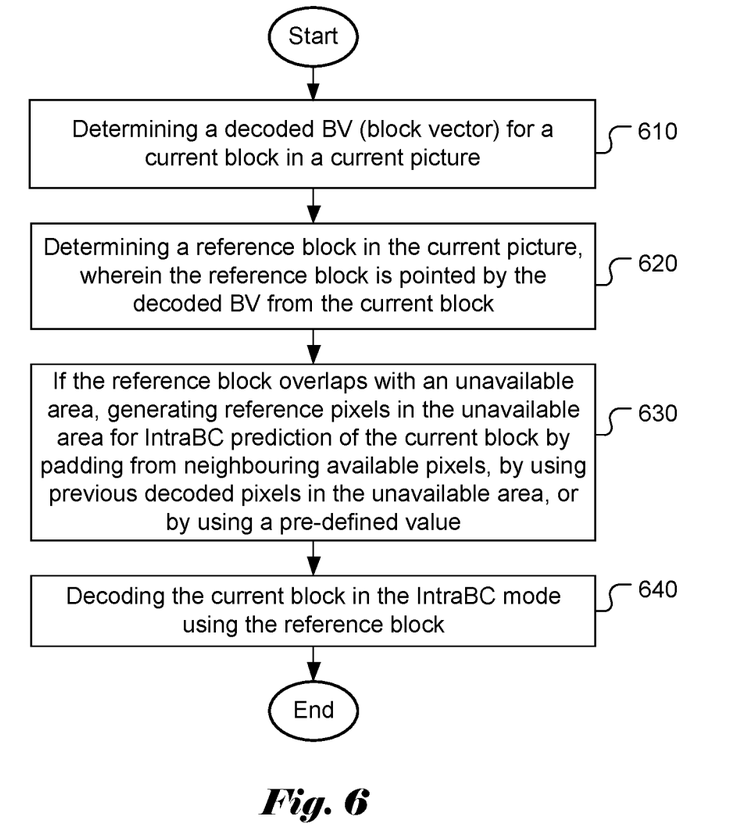
FIG. 6 illustrates a flowchart of an exemplary decoding system incorporating error handling according to an embodiment of the present invention for the case that a decoded block vector pointing to a reference block overlapping with an unavailable area.

FIG. 6 illustrates a flowchart of an exemplary decoding system incorporating error handling according to an embodiment of the present invention for the case that a decoded block vector pointing to a reference block overlapping with an unavailable area. A decoded BV (block vector) for a current block in a current picture is determined in step 610. A reference block in the current picture is determined in step 620, where the reference block is pointed by the decoded BV from the current block. If the reference block overlaps with an unavailable area, reference pixels in the unavailable area are generated for IntraBC prediction of the current block by padding from neighbouring available pixels, by using previous decoded pixels in the unavailable area, or by using a pre-defined value in step 630. Then, the current block in the IntraBC mode can be decoded using the reference block as shown in step 640.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of error handling for a video decoding system using an Intra Block Copy (IntraBC) mode, comprising:
   determining a decoded BV (block vector) for a current block in a current picture;
   determining a reference block in the current picture, wherein the reference block is pointed by the decoded BV from the current block;
   if the reference block overlaps with an unavailable area, generating reference pixels in the unavailable area for IntraBC prediction of the current block by padding from neighbouring available pixels, by using previous decoded pixels in the unavailable area, or by using a pre-defined value;
   setting all pixels in a storage area of the current picture to the pre-defined value before decoding the current picture; and
   decoding the current block in the IntraBC mode using the reference block.

2. The method of claim 1, wherein said padding from neighbouring available pixels corresponds to horizontal padding followed by vertical padding.

3. The method of claim 1, wherein said padding from neighbouring available pixels corresponds to vertical padding followed by horizontal padding.

4. The method of claim 1, further comprising storing a previous decoded block in the storage area of the current picture, wherein the reference block for the current block is fetched directly from the storage area of the current picture regardless whether the reference block is in the unavailable area or not.

5. The method of claim 4, wherein the pre-defined value is equal to $(1<<(bit\_depth-1))$, and wherein bit_depth corresponds to bit depth of the current picture.

6. The method of claim 5, wherein the pre-defined value is signalled in a SPS (sequence parameter set), PPS (picture parameter set), or slice header.

7. The method of claim 1, wherein the pre-defined value is equal to $(1<<(bit\_depth-1))$, and wherein bit_depth corresponds to bit depth of the current picture.

8. The method of claim 1, wherein all pixels in the reference block are generated using the pre-defined value.

9. The method of claim 1, wherein the pre-defined value is signalled in a SPS (sequence parameter set), PPS (picture parameter set), or slice header.

10. A video decoding system, comprising:
    one or more processors configured to execute program code to:
    determine a decoded BV (block vector) for a current block in a current picture;
    determine a reference block in the current picture, wherein the reference block is pointed by the decoded BV from the current block;
    if the reference block overlaps with an unavailable area, generate reference pixels in the unavailable area for IntraBC prediction of the current block by padding from neighbouring available pixels, by using previous decoded pixels in the unavailable area, or by using a pre-defined value;
    set all pixels in a storage area of the current picture to the pre-defined value before decoding the current picture; and
    decode the current block in the IntraBC mode using the reference block.

11. A non-transitory, machine-readable storage media comprising machine-readable code that, when executed by one or more processors, causes the one or more processors to:
    determine a decoded BV (block vector) for a current block in a current picture;

determine a reference block in the current picture, wherein the reference block is pointed by the decoded BV from the current block;

if the reference block overlaps with an unavailable area, generate reference pixels in the unavailable area for IntraBC prediction of the current block by padding from neighbouring available pixels, by using previous decoded pixels in the unavailable area, or by using a pre-defined value;

set all pixels in a storage area of the current picture to the pre-defined value before decoding the current picture; and decode the current block in the IntraBC mode using the reference block.

* * * * *

UNITED STATES PATENT AND TRADEMARK OFFICE
CERTIFICATE OF CORRECTION

| | | |
|---|---|---|
| PATENT NO. | : 10,356,438 B2 | Page 1 of 1 |
| APPLICATION NO. | : 15/578191 | |
| DATED | : July 16, 2019 | |
| INVENTOR(S) | : Tzu-Der Chuang et al. | |

It is certified that error appears in the above-identified patent and that said Letters Patent is hereby corrected as shown below:

On the Title Page

Item (71), the Applicant's city, is incorrect. Item (71) should read:
-- (71) Applicant: MEDIATEK INC., Hsinchu (TW) --

Signed and Sealed this
Fifth Day of November, 2019

Andrei Iancu
*Director of the United States Patent and Trademark Office*